United States Patent

Minakawa et al.

[11] Patent Number: 5,948,127
[45] Date of Patent: Sep. 7, 1999

[54] CYCLONE DUST COLLECTOR

[75] Inventors: Susumu Minakawa, Mito; Takao Kawasaki, Naka-gun, both of Japan

[73] Assignee: Japan Nuclear Cycle Development Institute, Ibaraki-ken, Japan

[21] Appl. No.: 08/962,013

[22] Filed: Oct. 31, 1997

[30] Foreign Application Priority Data

Nov. 12, 1996 [JP] Japan .................................. 8-315409

[51] Int. Cl.⁶ .................................................. B01D 50/00
[52] U.S. Cl. .................. 55/283; 55/284; 55/302; 55/337; 55/341.1; 55/372; 55/379; 55/459.1; 55/467; 55/472; 55/484; 96/427
[58] Field of Search ............................ 55/283, 284, 286, 55/287, 288, 302, 337, 459.1, 467, 470, 341.1, 372, 379, 472, 484; 96/424, 425, 426, 427, 428

[56] References Cited

U.S. PATENT DOCUMENTS

| 4,292,053 | 9/1981 | Remillieux ................................ 55/283 |
| 4,784,048 | 11/1988 | Nelson ....................................... 55/467 |

FOREIGN PATENT DOCUMENTS

| 2550352 | 5/1976 | Germany ................................ 55/337 |
| 2726735 | 1/1979 | Germany ................................ 55/283 |
| 8-309133 | 11/1996 | Japan . |

*Primary Examiner*—Jay H. Woo
*Assistant Examiner*—Robert A. Hopkins
*Attorney, Agent, or Firm*—Wenderoth, Lind & Ponack, L.L.P.

[57] ABSTRACT

A cyclone dust collector wherein the interior of a cyclone body is divided into an upper space and a lower space by a partition member provided with a plurality of cylindrical filters, a suction port is so provided as to communicate with the lower space, a common discharge port is so provided as to communicate with the upper space, a collected dust recovery box is fixed to the lower end of the cyclone body, and a discharge blower is connected to the discharge port of the cyclone body. The dust collector is further provided with backwashing stop valves capable of opening and closing upper end portions of the filters and having backwashing nozzles, stop valve driving mechanisms adapted to open and close the stop valves, compressed air hoses connected to the backwashing nozzles of the stop valves, and backwashing electromagnetic valves for controlling the supply and cutoff of backwashing compressed air to the compressed air hoses. Each of the filters is able to be backwashed independently by supplying compressed air to the filters via the compressed air hoses, with the upper end portions of the filters closed by the stop valves.

4 Claims, 4 Drawing Sheets

FIG. 2A
FIG. 2B
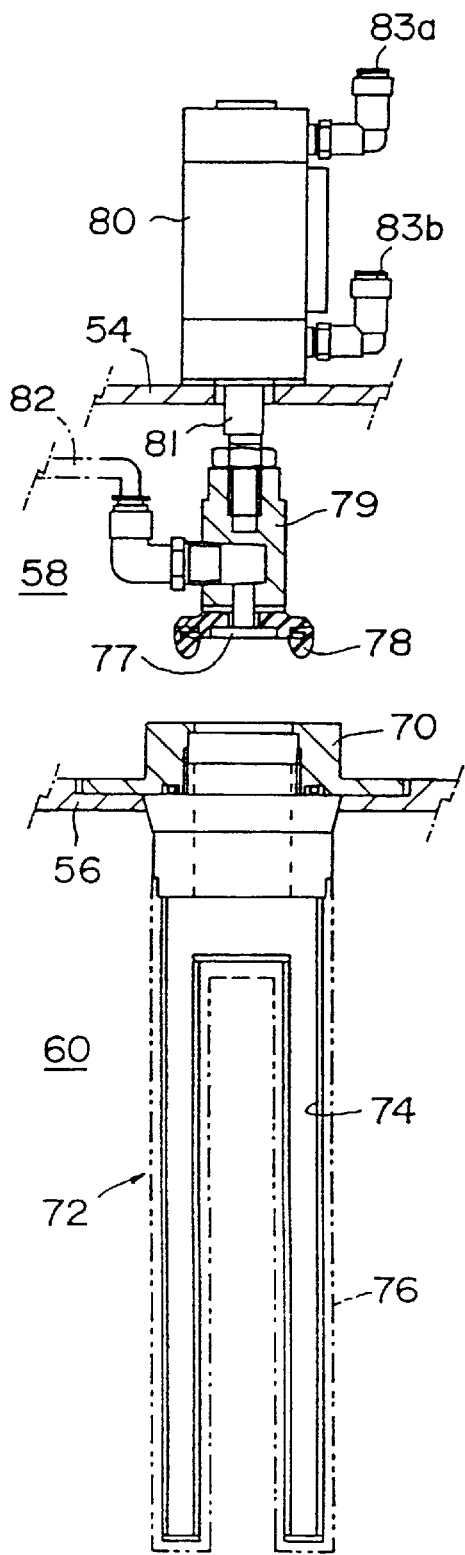
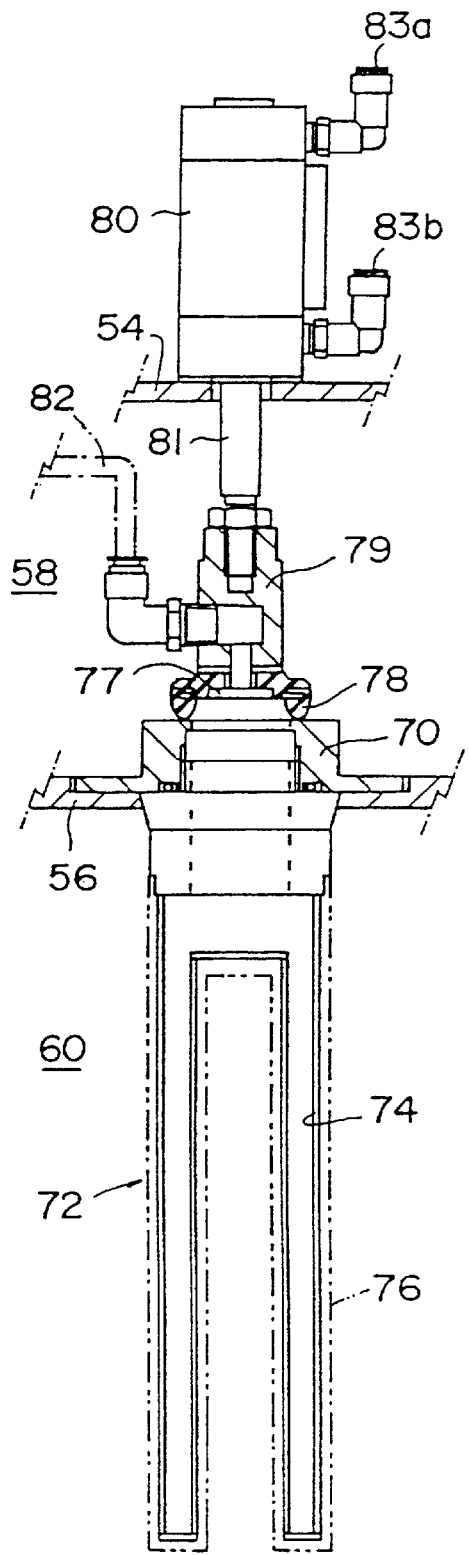

CYCLONE DUST COLLECTOR

BACKGROUND OF THE INVENTION

This invention relates to a cyclone dust collector capable of backwashing filters, which are provided in the interior of a cyclone body, independently of one another, and collecting and recovering dust (fine powder which is an object to be collected) efficiently. More particularly, the present invention relates to a cyclone dust collector structured compactly by uniting in one a cyclone body and a filter backwashing unit. Although the use of this cyclone dust collector is not specially limited, it is usefully provided in an already-installed glove box for the collection and recovery of dust of nuclear fuel substance therein carried out, for example, in a nuclear fuel pellet manufacturing step.

It is said that a cyclone dust collector and a bag filter-carrying dust collector are the main stream of apparatuses for collecting the dust included in a gas. However, these two kinds of dust collectors have advantages and disadvantages. The former is very simply constructed but low in dust collecting efficiency. The latter has a high dust collecting efficiency but it has a complicated construction and requires replacement of the filters, which have a short lifetime. Under the circumstances, a cyclone dust collector provided with a plurality of cylindrical filters in the interior of a dust collector body, in which a cyclone is utilized, has been developed as a dust collector for a nuclear fuel substance used in a nuclear fuel pellet manufacturing step.

An example of a conventional cyclone dust collector is shown in FIG. 5. The interior of a cyclone body 100 is divided into an upper space 106 and a lower space 108 by a partition member 104 which is provided with a plurality of cylindrical filters 102. A suction port 110 is provided so as to communicate with the lower space 108, and a common discharge port 112 is provided so as to communicate with the upper space 106. A collected dust recovery box 114 is fixed to the lower end of the cyclone body, and a discharge blower (not shown) is connected to the discharge port 112 of the cyclone body 100. Each of the cylindrical filters 102 is provided with a backwashing mechanism. Each backwashing mechanism is formed by fixing a backwashing nozzle 116 in a position in the upper space spaced from an upper portion of the corresponding cylindrical filter. A compressed air hose 120, having an electromagnetic switch valve 118, is connected to the backwashing nozzle 116.

When a dust-containing gas flows through the suction port into the cyclone body of such a cyclone dust collector, the gas flows downward as it rotates along the cylindrical inner wall surface thereof, and the dust flows toward the wall due to a centrifugal force exerted thereon, and is separated from the gas. In the meantime, the gas is discharged from the discharge port through the filters. Although fine dust continues to flow with the gas, it is separated and removed by the cylindrical filters when the gas flows therethrough.

In the filters, which have been used for a long period of time, clogging occurs due to the fine dust deposited thereon. This causes a pressure loss to increase, so that it becomes difficult to discharge the gas from the cyclone dust collector. In such a case, compressed air is ejected from the backwashing nozzles toward the filters, and a backwashing operation for shaking off the fine dust deposited on the filters is carried out.

In the cyclone dust collector of such a construction, a part of the compressed air ejected from the backwashing nozzles is discharged from the discharge port even during the backwashing operation. Therefore, the backwashing efficiency decreases, it is difficult to backwash the filters sufficiently, and it takes a long time to carry out backwashing operation. This causes the dust recovery efficiency to decrease.

The inventors of the present invention previously proposed (Japanese Patent Laid-open No. 8-309133/1996) a structure of a cyclone dust collector as a technique capable of solving these problems. The collector is formed by connecting the upper ends of cylindrical filters to their respective connecting pipes, one end of each of which is connected to a backwashing compressed air pipe via a three-way electromagnetic change-over valve, and the other end of each of which is connected to a pipe communicating with a gas discharging blower. In this dust collector, the backwashing of the filters and the discharging of the gas are switched from one to the other by the three-way electromagnetic change-over valves. Namely, the gas discharge system is closed and disconnected from the gas discharge blower, and, the supplying of backwashing compressed air is stopped during the discharging of the gas.

In such a structure, the lower end of each connecting pipe from which the backwashing air is ejected is Joined directly to the upper end of the corresponding filter, so that the backwashing efficiency becomes high, and a short-time sufficient filter backwashing operation is rendered possible. This enables the lifetime of the filters to be prolonged, and the dust recovery efficiency to be improved.

However, the construction of a header part including the dust collecting pipes and three-way electromagnetic change-over valves in an upper portion of the cyclone body becomes complicated and enlarged. In a newly installed facility, the space necessary for the installation of a cyclone dust collector can be secured in a glove box in a designing stage. However, in an existing glove box, a vacant space of only around 0.5 m$^3$ is available, so that such a dust collector cannot be installed therein. When the facility is operated with no dust collector incorporated therein, the dust produced during the process scatters in the glove box, and workers have to carry out a manual cleaning operation by using brushes every time a process finishes, so that long period of time and many workers are required to carry out a cleaning operation. Therefore, there is a demand for developement of a dust collector having dimensions which are small enough so that the dust collector can be installed even in an existing glove box. The dust collector must also have aggregated dust collecting pipes, and have a simple construction so that the dust collector can be easily assembled.

SUMMARY OF THE INVENTION

An object of the present invention is to provide a cyclone dust collector such that the dust collection and recovery efficiency is high, the backwashing efficiency of the filters incorporated therein is high, sufficient backwashing can consequently be done in a short time, the life of the filters is long, and the cyclone dust collector can be easily installed in an existing glove box by decreasing the size and simplifying the structure.

Another object of the present invention is to provide a cyclone dust collector capable of securing a required level of suction power by using even a miniaturized blower, reducing the dimensions and weight of the system as a whole, and being assembled easily.

In a cyclone dust collector according to the present invention, the interior of a cyclone body is divided into an upper space and a lower space by a partition member provided with a plurality of cylindrical filters. A suction port is provided so as to communicate with the lower space, and a common discharge port is provided so as to communicate with the upper space. A collected dust recovery box is fixed to the lower end of the cyclone body, and a discharge blower is connected to the discharge port of the cyclone body. The dust collector is provided with backwashing stop valves which are capable of opening and closing upper end portions of the cylindrical filters and have backwashing nozzles. Stop valve driving mechanisms are adapted to open and close the stop valves, and compressed air hoses are connected to the backwashing nozzles of the stop valves. Backwashing electromagnetic valves are provided for controlling the supply and cutoff of backwashing compressed air to the compressed air hoses. Due to this construction, the cylindrical filters can be backwashed independently by supplying compressed air to the filters via the compressed air hoses, with the upper end portions of the filters closed by the stop valves.

The discharge blower preferably comprises a plurality of miniaturized blowers which are series-connected or series- and parallel-connected so that a desired level of dust collecting capability is obtained. Each of the filters is formed of a combination of a cylindrical stainless steel filter body and a fine filter bag enclosing the filter body. The fine dust deposited on the filters is removed by the compressed air and deformation of the filter bags during a backwashing operation.

BRIEF DESCRIPTION OF THE DRAWINGS

FIG. 2 is a view showing the detail of essential portions of the cyclone dust collector.

PREFERRED EMBODIMENTS OF THE INVENTION

Figure 1:
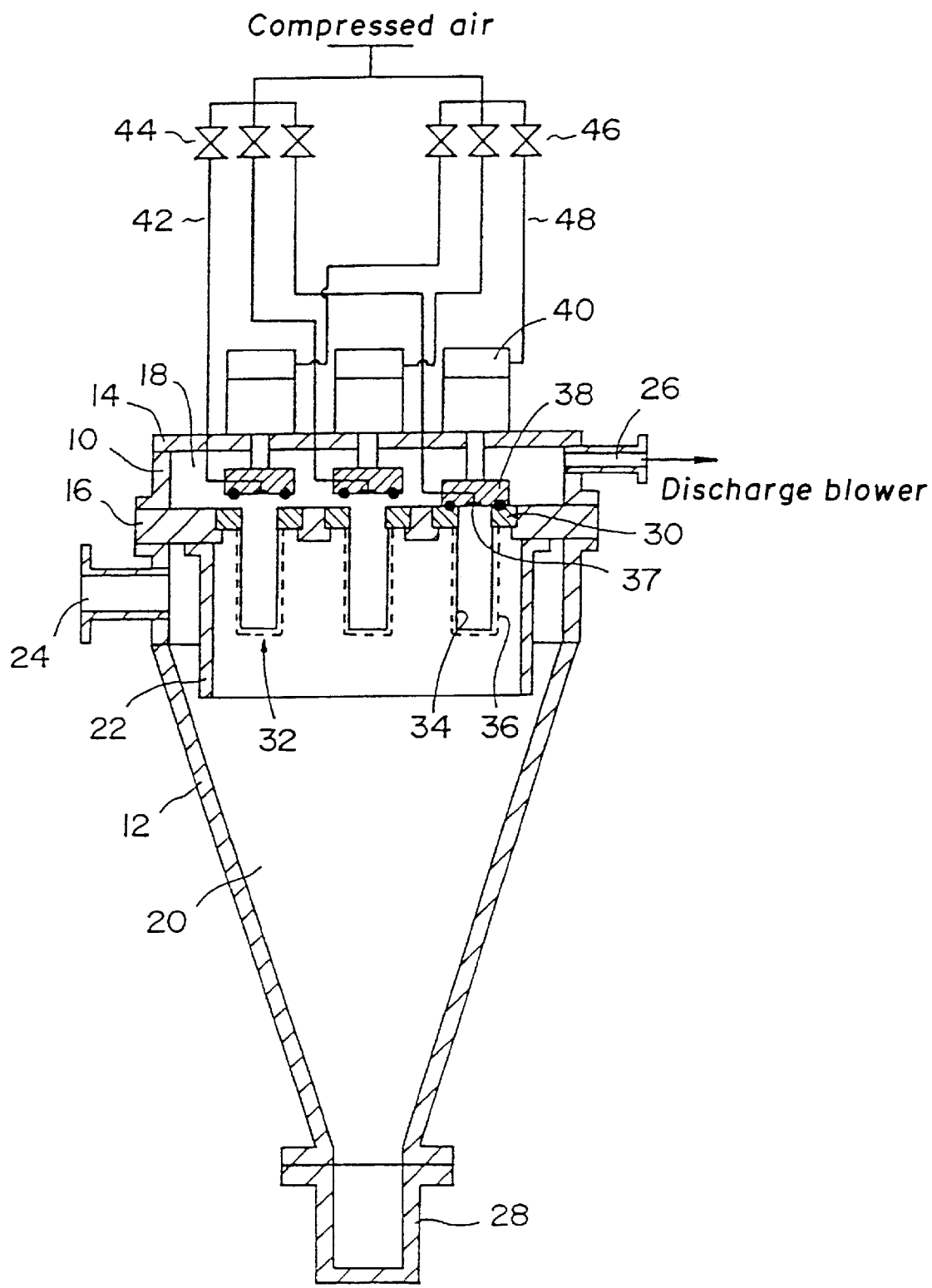
FIG. 1 is a sectional view showing an embodiment of a cyclone dust collector according to the present invention.

FIG. 1 is a schematic construction diagram of the cyclone dust collector according to the present invention. A cyclone body is formed by combining a cylindrical upper casing 10 and an inverted cone-shaped lower casing 12, and covering the upper end of the upper casing 10 with a lid 14. The interior of the cyclone body is divided (at an intermediate portion of the upper casing 10 in this embodiment) by a partition member 16 into an upper space 18 and a lower space 20. An inner cylinder 22 is suspended concentrically with the upper casing 10 from the partition member 16. The side wall of the upper casing 10 is provided with a suction port 24 communicating with the lower space 20. The position in which the suction port 24 is fixed is in the range in which the inner cylinder 22 vertically extends. The side wall of the upper casing 10 is provided with a common (single) discharge port 26 communicating with the upper space 18. A collected dust recovery box 28 is fixed to the lower end of the lower casing 12, and a discharge blower (not shown) is coupled to the discharge port 26.

The partition member 16 is provided with a plurality of openings (three openings in this embodiment), valve seats 30 for stop valves are fixed to circumferential portions of these openings, and cylindrical filters 32 are suspended from the valve seats 30. Each of the cylindrical filters 32 comprises a combination of a metal filter body 34, and a filter bag 36 enclosing the filter body. The inner cylinder 22 mentioned above is so formed as to surround all the cylindrical filters 32 and extend lower than the lower ends of the cylindrical filters 32, i.e., the inner cylinder 22 is designed so that the suction air does not flow directly toward the filters.

Above the valve seats 30, a corresponding number of backwashing stop valves 38, containing backwashing nozzles 37 therein, are positioned. The stop valves 38 are connected to stop valve driving mechanisms comprising compressed air cylinders 40 for vertically moving the stop valves so that the upper end portions of the cylindrical filters 32 can be opened and closed. Each stop valve 38 is provided with a seal on a lower surface of a valve disc thereof, so that the stop valve can seal together with the valve seat 30. Flexible compressed air hoses 42 are connected to the stop valves 38 so that the hoses communicate with the backwashing nozzles 37. Backwashing electromagnetic valves 44 are provided for controlling the supply and cutoff of the backwashing compressed air to the compressed air hoses 42. Compressed air pipes 48, are provided with electromagnetic valves 46 and are also connected to the compressed air cylinders 40.

During a normal dust collecting operation, all the stop valves 38 are lifted from the valve seats 30 by the compressed air cylinders 40 in order to open the upper ends of the cylindrical filters 32. Note, FIG. 1 shows the center and left-hand cylindrical filters opened and the right-hand filter closed. Gas containing dust to be collected and recovered is sucked by operation of the discharge blower, and the gas enters the interior of the cyclone body via the suction port 24. When the dust-containing gas flows through the suction port 24 into the portion of the interior of the lower space 20, which is between the upper casing 10 and the inner cylinder 22, it flows downward as it is rotated in the cylindrical portion of the lower space. During this time, a centrifugal force is exerted on the dust to cause the same to move toward the wall, so that the dust is separated from the gas. The separated dust falls along the side walls of the lower casing 12 and is collected and recovered in the collected dust recovery box 28. In the meantime, the gas passes through the cylindrical filters 32 and flows into the upper space 18. The fine dust which cannot be separated in the cyclone body is deposited on the cylindrical filters 32 (especially, on filter bags 36 on the outer side of the filter bodies) as the gas passes through the filters. The gas flowing into the upper space 18 is discharged through the discharge port 26 by the discharge blower.

After the cylindrical filters 32 are used for a long period of time, fine dust is deposited thereon (especially, the outer-side filter bags 36) and eventually clogs and filters. Consequently, the pressure drop increases, and the discharging of the gas becomes impossible, so that the dust cannot be collected and recovered by the cyclone. Therefore, it is necessary to backwash the cylindrical filters 32. The backwashing of the filters can be done one by one. Of course, all of the filters can be backwashed at once. FIG. 1 shows one of the cylindrical filters, i.e. the right-hand filter being subjected to backwashing. During a backwashing operation, a stop valve 38 opposed to the corresponding cylindrical filter 32 is brought into pressure contact with the corresponding valve seat 30 by the corresponding compressed air cylinder 40 in order to close the upper end of the filter 32. The corresponding backwashing electromagnetic valve 44 is then opened to eject compressed air from the corresponding backwashing nozzle 37. Consequently, the fine dust deposited on the cylindrical filter 32 (especially, the outer-side filter bag 36) is shaken off and recovered in the collected dust recovery box 28.

Even while one cylindrical filter is backwashed, a dust collect-recovering operation using the other filters can be carried out. Accordingly, continuous dust collection and removal of fine dust can be carried out simultaneously by executing the backwashing of the filters in a one by one manner.

Essential portions of an embodiment of the cyclone dust collector according to the present invention is shown in FIG. 2. In FIG. 2A–2B, one cylindrical filter, the corresponding stop valve and the corresponding driving mechanism are shown. In particular, FIG. 2A shows a normal dust collection operation, and FIG. 2B shows a filter backwashing operation. A basic construction of a cyclone body is illustrated in FIG. 1. Three valve seats 70, for the same number of stop valves, are arranged in a distributed manner at regular intervals on the same circle to the disc type partition 56 dividing the interior of the cyclone body into an upper space 58 and a lower space 60. Each valve seat 70 comprises a cylindrical portion, and a flange portion provided on a lower end of the cylindrical portion. A cylindrical filter 72 is suspended from the valve seat 70. The valve seat 70 is inserted through an opening in the partition 56, and fixed to the partition 56, with the filter in contact with the flange portion of the valve seat 70. The cylindrical filter comprises a combination of a stainless steel mesh filter body 74, and a filter bag (commercial name: Goatex Membrane Filter Bag manufactured by the Japan Goatex Co., Ltd.) 76 enclosing the filter body. The cylindrical filter has an inverted U-shaped structure in which the filter is folded so as to form a double structure for the purpose of increasing the surface area. The stainless mesh filter body 74 functions as a backup member when the filter bag 76 is torn, and has a shape retaining effect by which the filter bag 76 is maintained in a predetermined shape.

A backwashing stop valve 78 is provided with a backwashing nozzle 77 and is capable of opening and closing the upper end portion of the corresponding cylindrical filter 72. Each backwashing stop valve is positioned above each valve seat 70. The stop valves 78 are movably vertically by a compressed air cylinder 80 serving as a stop valve driving mechanism, i.e., the stop valve moves into pressure contact with the valve seat 70 to enable the filter to be opened and closed. The stop valve 78 comprises a-cup-shaped member of synthetic rubber, in the lower end of an inner portion of which a backwashing nozzle 77 is incorporated. The stop valve 78 is fixed at its upper end to a valve base 79 provided on the upper side thereof. The valve base 79 is fixed to the lower end of a piston 81 of the compressed air cylinder 80. The valve base 79 has a hollow structure at its lower portion, which communicates at its lower end with the backwashing nozzle 77. A flexible hose 82 is connected to the side wall of the valve base, and the compressed air flowing through this hose is ejected from the backwashing nozzle 77. The compressed air hose 82 is provided at an intermediate portion thereof with a backwashing electromagnetic valve (numeral 44 in FIG. 1) for controlling the supply and cutoff of the backwashing compressed air to the backwashing nozzle 77.

The stop valve driving mechanism comprises the compressed air cylinder 80, which is air-tightly mounted on a lid 54 constituting the cyclone body. Electromagnetic valve-carrying compressed air pipes (numeral 48 in FIG. 1) are connected to upper and lower compressed air supply ports 83a, 83b of the compressed air cylinder 80.

As mentioned above, FIG. 2A shows a dust collecting operation using a cyclone. The valve base 79 is moved up by supplying compressed air through the lower compressed air supply port 83b into the compressed air cylinder 80. Consequently, the stop valve 78 fixed to the valve base 79 leaves the valve seat 70, and a passage for the gas which is to flow through the cylindrical filter 72 is thereby formed. Accordingly, the collection and recovery of dust using an action of the cyclone is carried out by discharging the gas by the discharge blower, with the parts kept in this state.

FIG. 2B shows a cylindrical filter-backwashing operation. When compressed air is supplied through the upper compressed air supply port 83a into the compressed air cylinder 80, the valve base 79 moves down. Consequently, the stop valve 78 fixed to the valve base is brought into pressure contact with the valve seat 70 to seal the upper end of the cylindrical filter 72, so that a gas passage extending from the lower space 60 to the upper space 58 through the cylindrical filter 72 is shut off. When compressed air is then supplied to the valve base 79 through the compressed air hose 82, by opening the backwashing electromagnetic valve (numeral 44 in FIG. 1), the air passes through the interior of the valve base 79 and is ejected downward from the backwashing nozzle 77. As a result, the fine dust deposited on the outer-side filter bag 76 is removed therefrom. The cup-shaped rubber stop valve 78 is so designed that it is brought into pressure contact with the valve seat 70 firmly during the supplying of compressed air so as to prevent the compressed air from leaking from this contact portion.

The dust collector as a whole according to the present invention can be miniaturized since it is possible to unite a header portion and a cyclone body with each other in one body, and aggregate the dust collecting pipes. The further miniaturization of the system as a whole is possible by improving the discharge blower which is essential to the system. The discharge blower used in an ordinary cyclone dust collector comprises a special blower of considerably heavy weight (exceeding 100 kg) for suppressing the pressure loss ascribed to the filters and pipes in the dust collector body. When such a discharge blower is installed in an existing glove box, a bag-in operation (an operation for sealing an object placed outside the glove box in a vinyl bag, which is fixed to the glove box, by fusion, and then inserting the resultant object in the glove box) and the assembling work become very difficult. Therefore, the dust collector is so formed that a desired level of dust collecting capability is displayed, by series-connecting or series- and parallel-connecting a plurality of miniaturized blowers.

Figure 3:
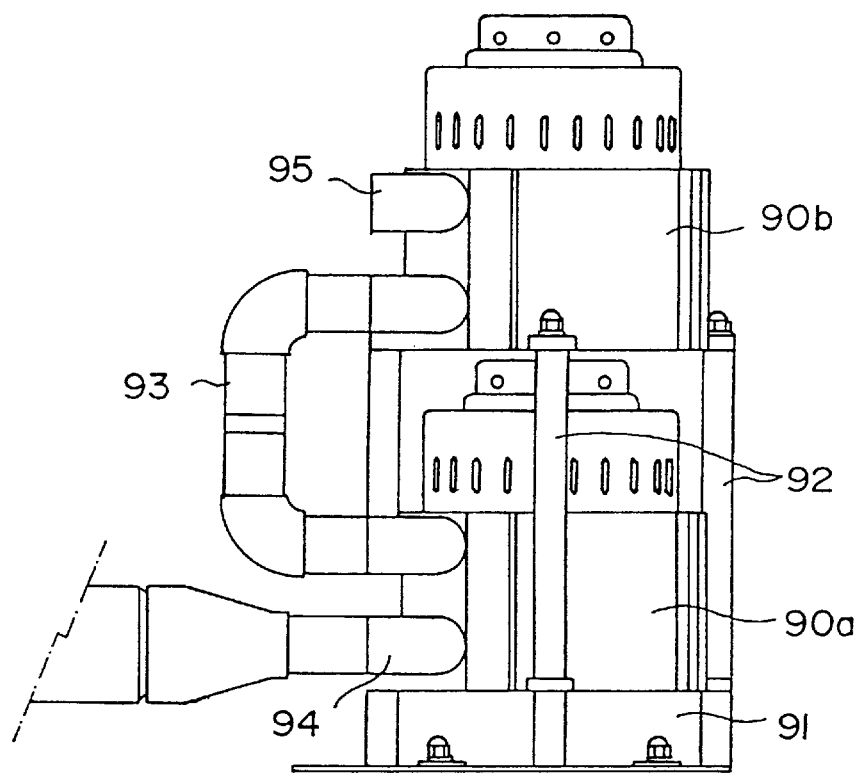
FIG. 3 is a front view showing the state of series-combined blowers.

In an example shown in FIG. 3, two miniaturized blowers 90a, 90b are series-connected. This example employs a two-stage structure, in which one miniaturized blower 90a is mounted on a base 91. Four stays 92 are provided on base 91, and on the stays the other miniaturized blower 90b is supported. A discharge port of one miniaturized blower 90a and a suction port of the other 90b are joined together by a pipe 93. A suction port 94 of the miniaturized blower 90a is connected via a pipe to the cyclone body so as to suck a gas therethrough, and the gas is discharged from a discharge port 95 of the miniaturized blower 90b. In this system, the miniaturized blowers 90a, 90b can be carried as they are into a glove box by a bag-in operation, so that the assembling work can also be carried out very easily. When two such blowers are series-connected, the vacuum pressure necessary for the cyclone discharge operation can be secured. It is preferable in practice to incorporate a prefilter and a flowmeter (none of which are shown) in a discharge pipe between the cyclone body and the blower system. The degree of clogging of the filters and the time at which the backwashing operation should be carried out can be judged accurately with reference to the flowmeter.

Figure 4:
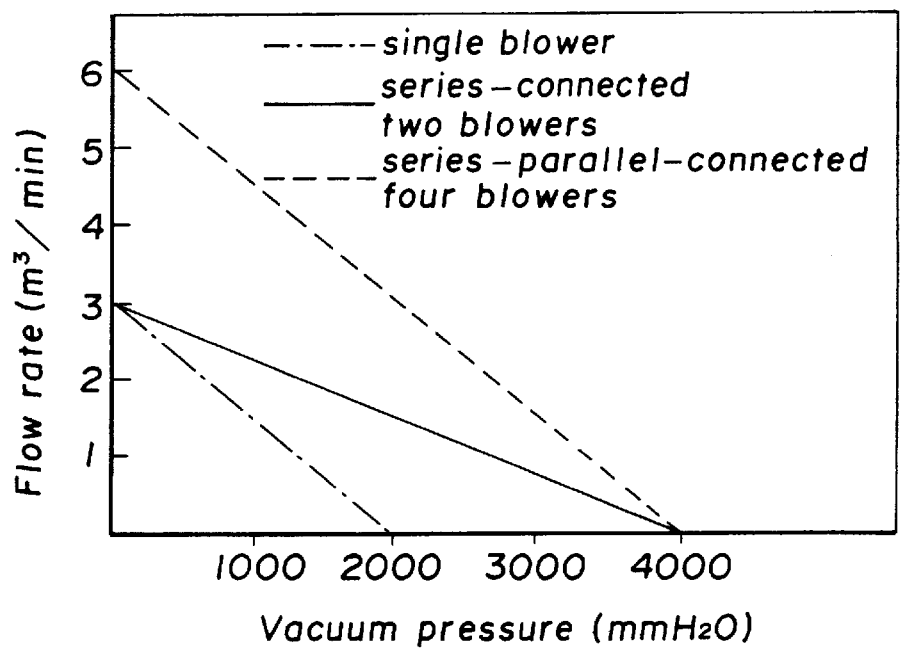
FIG. 4 is an explanatory diagram showing the dust collecting performances of systems provided with differently connected blowers.
Figure 5:
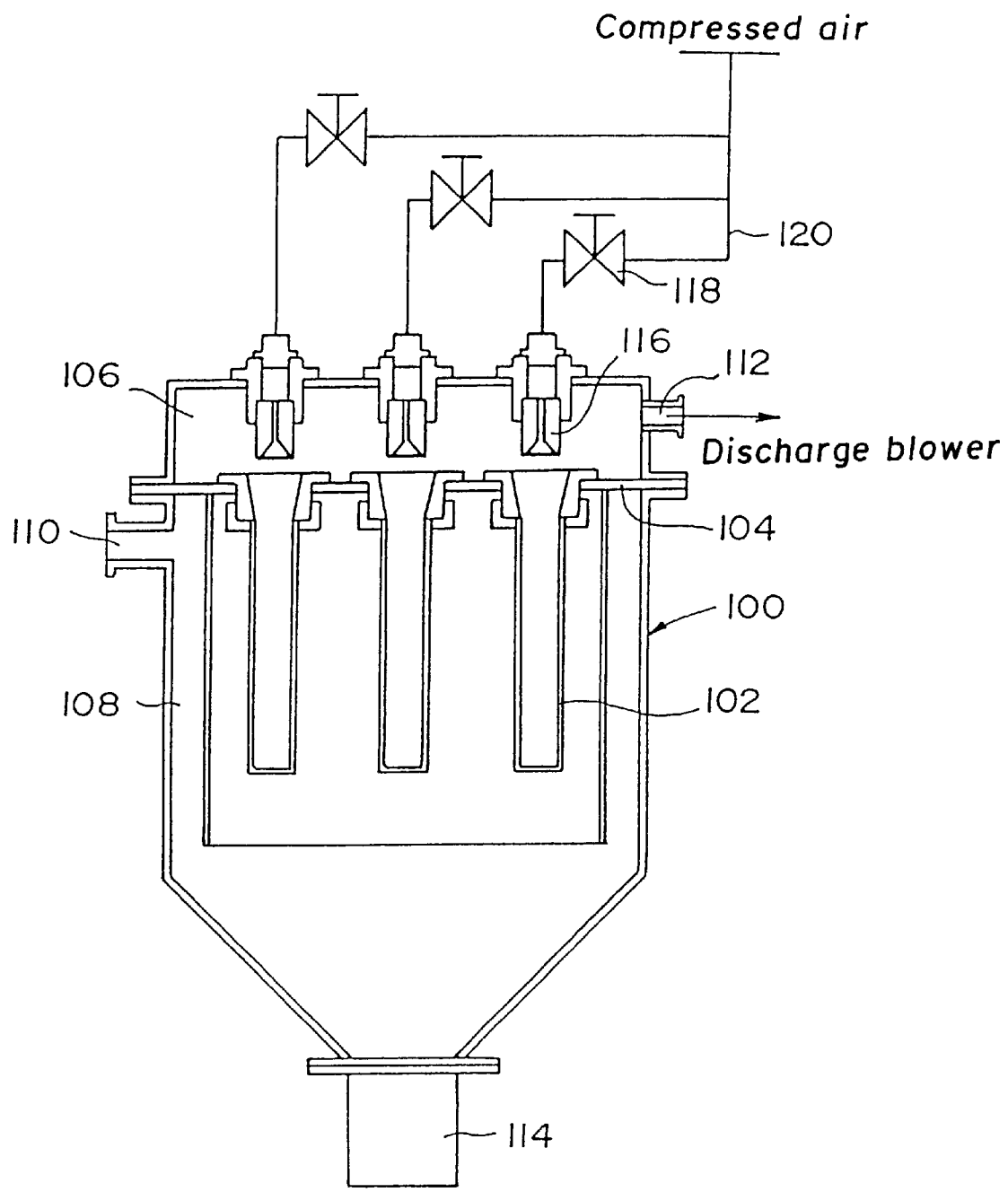
FIG. 5 is an explanatory view showing an example of a conventional cyclone dust collector.

The dust collecting performances of the blower system according to various kinds of blower connections are shown in FIG. 4. A one-dot chain line represents the performance of a blower system comprising a single miniaturized blower, a solid line reprsents the performance of a blower system comprising two series-connected miniaturized blowers, and a broken line represents the performance of a blower system comprising four series- and parallel-connected miniaturized blowers (two pairs of two series-connected blowers are parallel-connected). These miniaturized blowers are used for an industrial cleaning machine, and has, for example, a size of about 280 mm×280 mm×490 mm, a weight of about 12 kg and a capability of producing a vacuum pressure of about 2000 mmH$_2$. The above-described embodiment of the cyclone dust collector has a pressure loss of a total of about 2000 mmH$_2$ due to the provision of the filters and pipes, so that the gas suction cannot be carried out by one miniaturized blower. When two miniaturized blowers are series-connected as shown in FIG. 3, up to about 4000 mmH$_2$ of gas can be sucked, and the miniaturization of a discharge blower system can be attained. When the gas flow rate is insufficient, a blower system in which a plurality of sets of series-connected miniaturized blowers are parallel-connected, i.e. a blower system comprising series- and parallel-connected miniaturized blowers is employed, and thus a required gas quantity can be secured.

According to the present invention described above, a filter backwashing mechanism is incorporated in the interior of the cyclone body and united with other parts therein, and dust collecting pipes are aggregated. Therefore, the simplification of the construction and the reduction of the dimensions of the dust collector as a whole can be attained due to a decrease in the number of parts. This enables the dust collector to be installed not only in a new glove box, but also in an existing glove box. Of course, it becomes possible to sufficiently increase the dust collect-recovery efficiency and the efficiency of backwashing the filters incorporated in the cyclone body, and prolong the useful life of the filters.

When a discharge blower system comprising series-connected or series- and parallel-connected miniaturized, small-weight blowers is provided in the present invention, a required suction capacity can be secured, and the dimensions and weight of the system as a whole can be reduced. Moreover, the work of incorporating the system in, for example, a glove box can be carried out easily.

What is claimed is:

1. A cyclone dust collector comprising:

a cyclone body having a top lid and a dust recovery box fixed to a lower end of said cyclone body;

a partition positioned in an interior of said cyclone body so as to divide said interior into an upper space and a lower space;

a plurality of cylindrical filters suspended from said partition member;

a suction port provided in said cyclone body so as to communicate with said lower space;

a discharge port provided in said cyclone body so as to communicate with said upper space;

a discharge blower connected to said discharge port;

a plurality of backwashing stop valves capable of opening and closing upper end portions of said cylindrical filters, respectively;

a plurality of backwashing nozzles disposed within said backwashing stop valves, respectively;

a plurality of stop valve driving mechanisms adapted to open and close said backwashing stop valves, respectively;

a plurality of compressed air hoses connected to said backwashing nozzles, respectively, for supplying backwashing compressed air; and a plurality of backwashing electromagnetic valves for controlling the supply and cutoff of the backwashing compressed air to said compressed air hoses, respectively, each of said stop valve driving mechanisms comprises a compressed air cylinder air-tightly mounted on said top lid of said cyclone body and a piston vertically movable in said cylinder by selectively supplying compressed air into said cylinder, said compressed air cylinder being connected to a compressed air pipe provided with an electromagnetic valve for controlling the supply of compressed air to said cylinder, and said respective backwashing stop valve being provided at a lower end of said piston, wherein said respective cylindrical filters can be independently backwashed by supplying compressed air to said filters via said compressed air hoses, while said upper end portions of said cylindrical filters are closed by said stop valves.

2. The cyclone dust collector as claimed in claim 1, wherein said discharge blower comprises a plurality of miniaturized blowers which are series-connected or series- and parallel-connected in order to provide a desired level of dust collecting capability.

3. The cyclone dust collector as claimed in claim 1, wherein said cylindrical filter comprises a cylindrical stainless steel filter body and a fine filter bag enclosing said filter body.

4. The cyclone dust collector as claimed in claim 1, further comprising an inner cylinder suspended from said partition member, said inner cylinder being formed so as to surround all of said cylindrical filters and to extend below the lower ends of said cylindrical filters.

* * * * *